United States Patent

[11] 3,609,444

| [72] | Inventor | Raymond Charles Van Den Heuvel<br>Northridge, Calif. |
| --- | --- | --- |
| [21] | Appl. No. | 831,130 |
| [22] | Filed | June 6, 1969 |
| [45] | Patented | Sept. 28, 1971 |
| [73] | Assignee | RCA Corporation |

[54] CONSTANT TIME STROKE GENERATOR
7 Claims, 4 Drawing Figs.
[52] U.S. Cl. .................................................. 315/18,
315/26
[51] Int. Cl. ..................................................... H01j 29/70
[50] Field of Search .......................................... 315/18;
340/324.1, 172.5

[56] References Cited
UNITED STATES PATENTS
3,320,409   5/1967   Larrowe .................. 340/324.1 X
3,500,332   3/1970   Vosbury .................. 340/172.5

Primary Examiner—Rodney D. Bennett, Jr.
Assistant Examiner—Brian L. Ribando
Attorney—H. Christoffersen ABSTRACT: A plurality of waves are produced, each in response to a different digit of a binary number. A wave may be of constant amplitude and have one of two values or may be increasing or decreasing from one of these values to the other depending upon whether, since a preceding time interval, the digit represented by the wave has not or has changed its value. The waves are added, each with a weight corresponding to a different power of two, to provide the deflection waveform to be applied, for example, to the X-deflections means of a cathode-ray tube. In analogous fashion, the weighted sum of a second plurality of waves serves as the deflection waveform for the Y-deflection means of the cathode-ray tube.

INVENTOR
Raymond Charles Van Den Heuvel

INVENTOR
Raymond Charles Van Den Heuvel 3,609,444

CONSTANT TIME STROKE GENERATOR

BACKGROUND OF THE INVENTION

Computer-driven displays today are finding important applications in the fields of public transportation, computer aided instruction, finance (stock quotation systems, for example), computer aided circuit and mechanical design, and so on. Many different forms of displays have been proposed, some of which are available commercially, each with its own good and bad features.

For example, the monoscope symbol writer, while it is of low initial cost and provides relatively good symbol quality, is of relatively limited speed and flexibility. The displays formed of patterns of dots, while they employ relatively straightforward digital circuits, produce characters at relatively low speeds and some of relatively poor quality. The stroke writers, that is, the systems which generate analog deflection waveforms directly at high speed, can produce high-quality images. However, the design of the electron beam deflection waveform generator is critical in that the waveforms produced must be accurate, linear, precisely timed and free of transients to insure that, during each stroke, the cathode ray tube spot moves in straight line segments between accurately positioned points and without unwanted discontinuities or deviations. There are severe problems in meeting these requirements at very high speeds without causing transients to be produced (and displayed) at the end points of the strokes.

The object of the present invention is to provide a relatively low cost, new and improved system for generating strokes which may be employed to form high-quality letters, numbers, symbols, vectors and the like on the screen of a display means such as a cathode ray tube.

SUMMARY OF THE INVENTION

In response to a group of signals representing the digits of a binary number, a corresponding group of analog waves is produced. A wave has a constant value, is of increasing amplitude, or is of decreasing amplitude, depending upon whether the digit to which it corresponds has remained at the same value, has changed its value in one sense, or has changed its value in the opposite sense, respectively. The waves are summed in weighted fashion to produce a deflection waveform which represents the change in value of a binary number.

DETAILED DESCRIPTION

Figure 1:
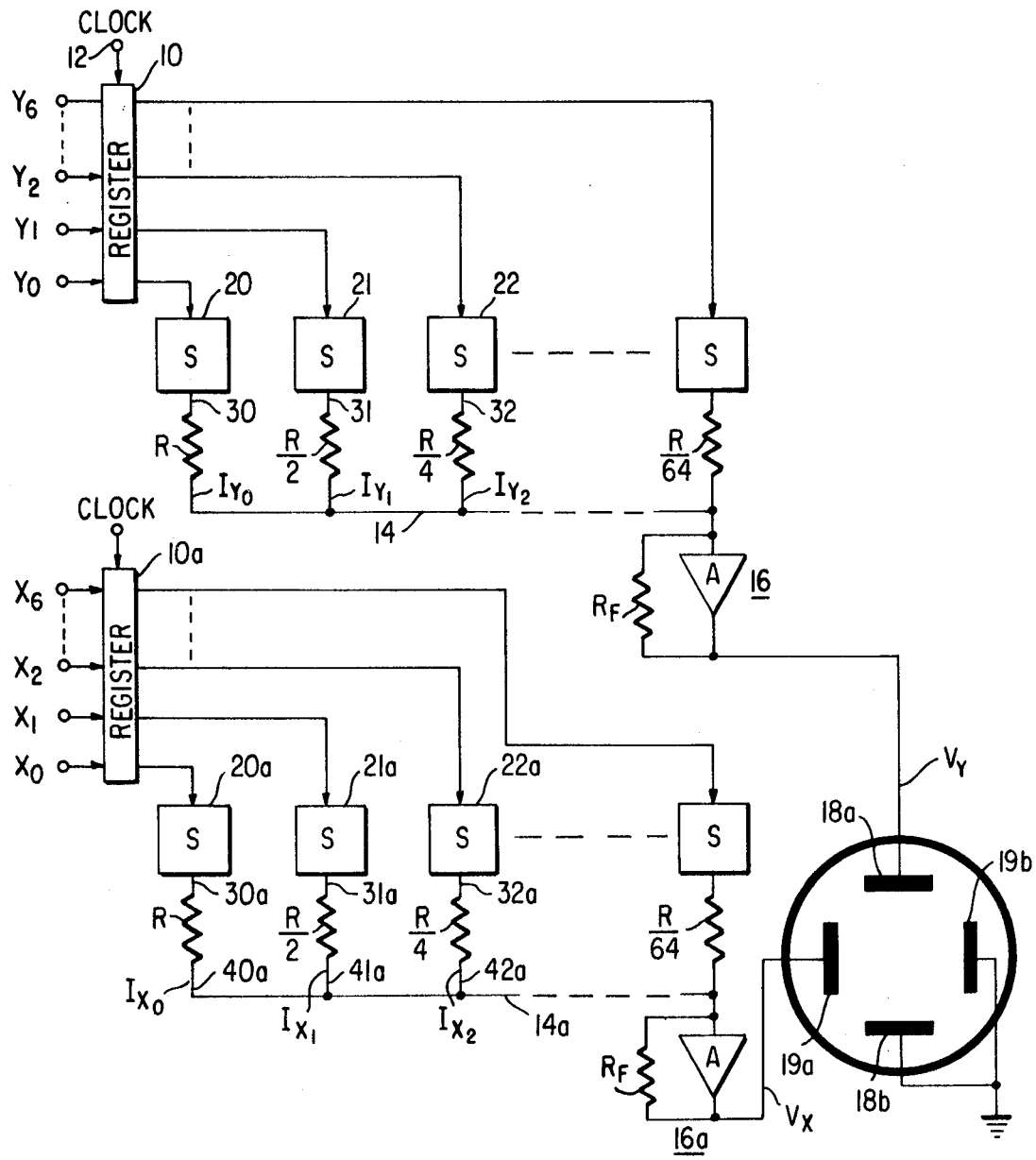
FIG. 1 is a block and schematic diagram of a preferred form of the present invention.

The system of FIG. 1 includes a circuit shown at the upper part of the figure for generating the Y deflection waveform for a cathode ray tube display and a circuit shown at the lower part of the figure for generating the X-deflection waveform. As both circuits are identical, only the upper one will be discussed in detail. Corresponding parts in the X-circuits and Y-circuits are identified by the same or similar reference characters, followed in some cases by alphabetic characters.

The Y-deflection circuit includes, for example, a seven stage register 10 to which signals representing a seven digit binary number $Y_6, Y_5 ... Y_1, Y_0$ are applied, where $Y_0$ represents the least significant digit and $Y_6$ the most significant digit. It is to be understood, of course, that each number (and register) may have more or fewer than seven binary digits (bits), depending upon the deflection wave accuracy desired. The register accepts and stores the seven Y-input signals in response to a clock pulse applied to terminal 12. The clock pulses are of short duration and occur at fixed time intervals. The register applies its seven outputs to seven selector circuits S, only four of which are shown. The selector circuits are identical and are discussed in detail later in connection with FIG. 2.

Each selector circuit produces an output which has one of four characteristics: it may be of constant value and relatively positive or relatively negative, or it may be a ramp which increases or decreases from one of these values to the other. A selector circuit produces a constant output if there has been no change, between successive clock pulses, in the value of its binary digit (that it, no change in the state of the register stage to which the selector is connected); it produces a positive-going ramp if its binary digit has changed from binary 0 to binary 1 between successive clock pulses; and it produces a negative-going ramp if its binary digit has changed from binary 1 to binary 0 between successive clock pulses.

The selector circuits S apply the waves they produce through resistors of different value to a common summing bus 14. Each resistor has a value inversely proportional to the power of two represented by the corresponding digit. Thus, if the resistor corresponding to the least significant digit $Y_0$ has a value R, as indicated, the resistor for the next most significant bit $Y_1$ has a value R/2; the resistor for bit $Y_2$ has a value R/4; the resistor (not shown) for bit $Y_3$ has a value R/8; the resistor (not shown) for bit $Y_4$ has a value R/16; the resistor (not shown) for bit $Y_5$ has a value R/32; and the resistor for bit $Y_6$ has a value R/64. While, in FIG. 1, each resistor is shown as a single element, in practice, each may be a network which includes both a series resistor and, in addition, a shunt resistor connected between the output terminal of the selector and ground. The values of these two resistors are such that each selector is terminated by the same value of resistance and each series resistor passes a current proportional to a different power of 2. Examples are given later.

The currents passing through the resistors to the summing bus 14 are applied to the summing amplifier 16 which is represented in the drawing in conventional fashion by an amplifier A and a feedback resistor $R_F$. The voltage produced by the summing amplifier 16 is applied to the pair of deflection plates 18 one of which 18a is connected to the amplifier and the other of which 18b is connected to ground.

For purposes of the explanation which follows, the system of FIG. 1 may be assumed to have only three X-binary inputs and three Y-binary inputs, the remaining four bits being absent entirely. The operating principle remains the same for the greater number of bits of FIG. 1 but there is finer deflection control possible.

In the operation of the system of FIG. 1, assuming only the first three selectors 20, 21, 22 and 20a, 21a and 22a are present, during successive time intervals, signals indicative of successive binary numbers are applied to the registers 10 and 10a. For example, as illustrated in FIG. 3, to start with time $T_0$, signals representing the number 011, corresponding to $X_2, X_1, X_0$, may be applied to register 10a at the same time that signals representing the number 000, corresponding to $Y_2, Y_1, Y_0$ are applied to register 10.

In response to these inputs, assuming the registers initially are both reset to 000, selector 20a produces a positive-going voltage ramp at lead 30a, selector 21a produces a positive-going voltage ramp of the same amplitude at lead 31a and selector 22a produces a constant voltage at lead 32a. In a similar fashion, selectors 20, 21 and 22 all produce a constant voltage at their respective output leads 30, 31 and 32. In response to the positive-going ramps at leads 30a and 31a, resistor R passes half the amount of current as resistor R/2. Accordingly, the currents $I_x$ and $I_x$ present at 40a and 41a during the interval $T_0$ to $T_1$ are as shown in FIG. 3, the ramp $I_x$ having half the amplitude as the ramp $I_x$.

Figure 3:
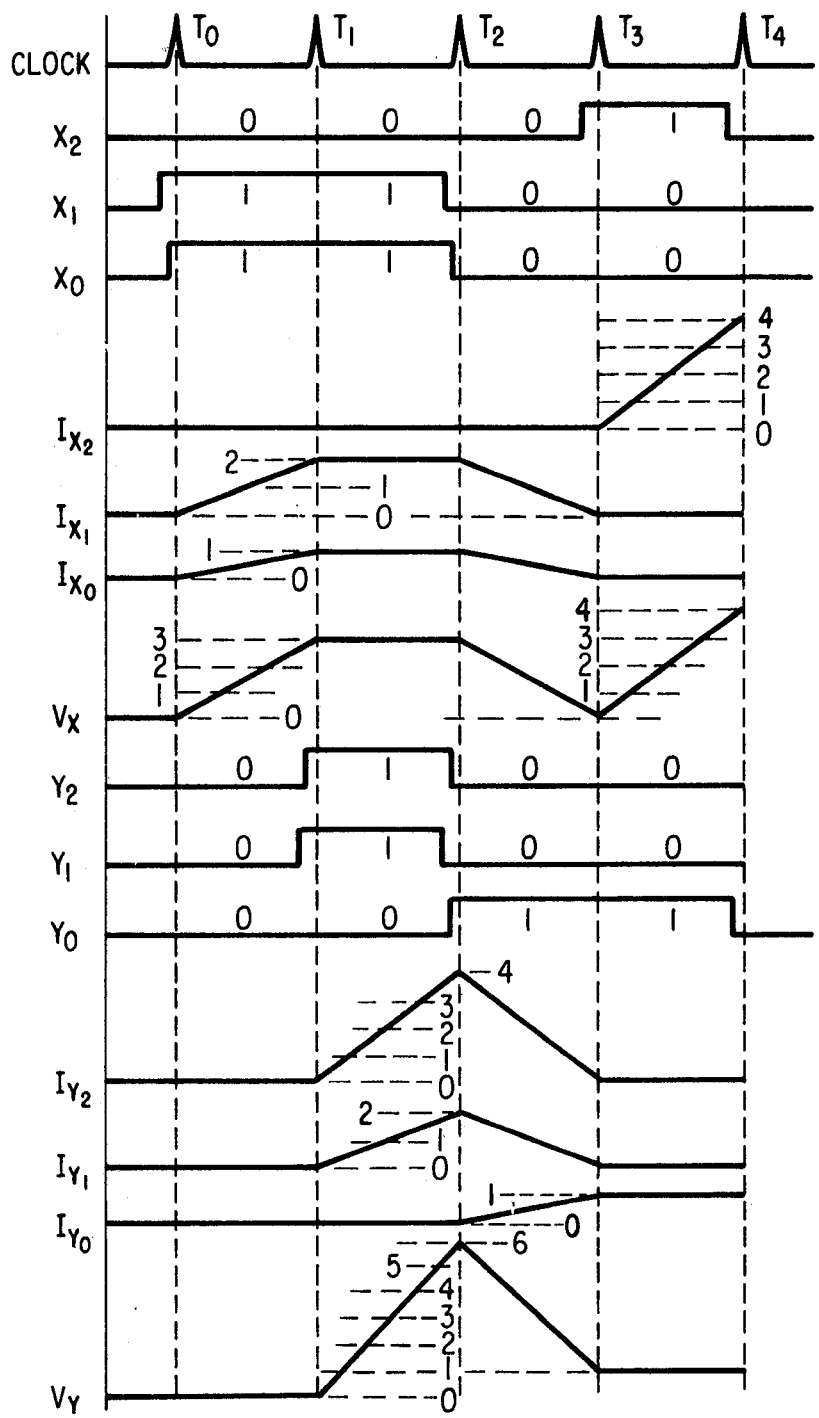
FIG. 3 is a drawing of waveforms to help explain the operation of the circuit of the present invention.

It may also be observed from FIG. 3 that the clock pulses such as $T_0$, $T_1$ and so on, staticize the incoming information. For example, the leading edges of the waves $X_0$ and $X_1$ need not be time coincident nor need they be coincident with the timing pulse $T_0$. It is only necessary that these waves $X_0$, $X_1$ and $X_2$ have the desired value (representing 1 or 0) when the pulse $T_0$ occurs, so that correct signal levels can be clocked into and stored in the register.

During successive time intervals, the binary numbers represented by the X-input and Y-input signals may change as shown in FIG. 3. For example, at time $T_0$ the Y-input number is 000; at time $T_1$ it has changed to 100; at time $T_2$ it has changed to 001 and so on. Each binary number represents a coordinate of an end point on the screen of the oscilloscope, the X-number representing the X-coordinate and the Y-number, the Y-coordinate. The sum waveform present on a summing bus 14 or 14a, during the interval from one clock pulse to the next clock pulse, represents the transition from an end point represented by one number stored in a register to the end point represented by the next number stored in the register. This transition, in the form of a constant, or an increasing, or a decreasing current at a summing bus 14 or 14a, is translated by a summing amplifier 16 or 16a, to a deflection voltage. The two parts of the system produce the two deflection voltages $V_x$ and $V_y$, illustrated in FIG. 3, which are respectively applied to the vertical and horizontal deflection plates 18 and 19.

Figure 4:
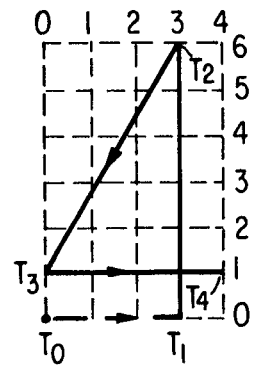
FIG. 4 is a drawing of a numeral displayed in response to the deflection waveforms $V_x$ and $V_y$ of FIG. 3.

FIG. 4 shows the numerical symbol traced on the screen of the oscilloscope in response to the deflection waveforms $V_x$ and $V_y$. The starting point $T_0$ corresponds to the first clock pulse $T_0$. During the time increment $T_0$ to $T_1$, the electron beam is translated from point $T_0$ to point $T_1$. During this period, the electron beam is blanked by applying, for example, to its cathode, a blanking voltage. The means for doing this is conventional and plays no part in the present invention and is not illustrated. Thereafter, the beam is turned on and is deflected from $T_1$ to $T_2$ to $T_3$ to $T_4$ to trace out the number 4. It is found, in practice, that the end points of each stroke are very accurately defined and that there is essentially no overshoot or other distortion at the end points. One reason is that the transition from an end point to the start of the next stroke is very gradual and is the result of adding very small changes in signal level. There is no switching or sharp transient from the end of one stroke to the start of another and therefore no ringing or other spurious signal generation.

The clock pulses occur at equal time increments and therefore each stroke starts a fixed time interval after the start of the previous stroke. As the electron beam may move a shorter or longer distance during a stroke interval, and as each stroke interval is of the same duration, it is clear that the electron beam velocity is, in general, different during different strokes.

Figure 2:
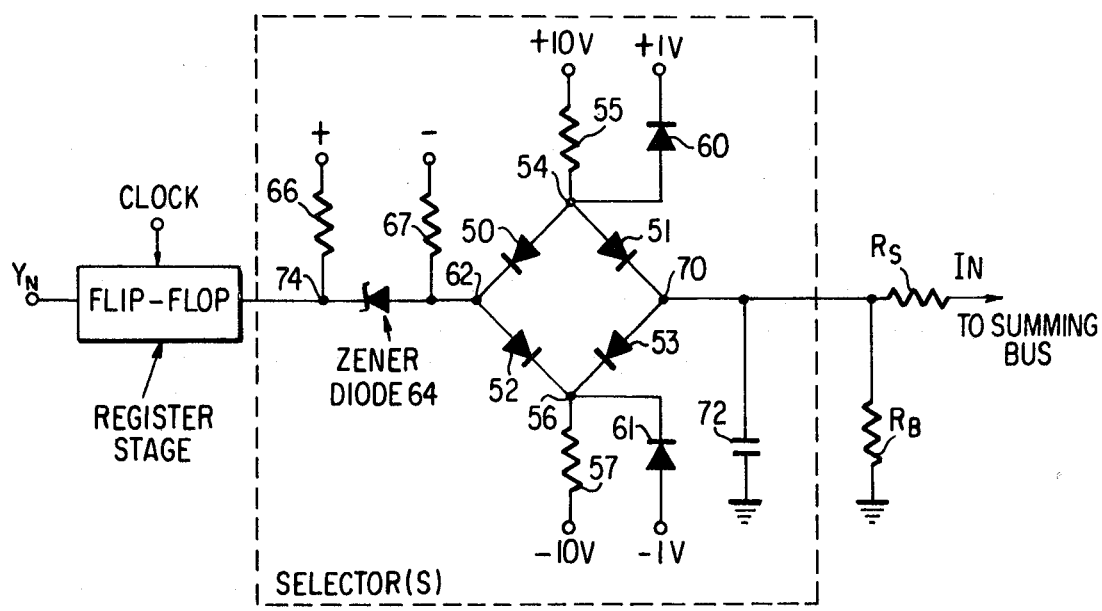
FIG. 2 is a schematic circuit diagram which includes a more detailed showing of the selector circuits S of FIG. 1.

A preferred selector circuit is shown in FIG. 2. It includes a diode bridge having four diodes 50, 51, 52 and 53. The bridge is connected at one terminal 54 through resistor 55 to a +10-volt source and it is connected at its opposite terminal 56 through resistor 57 to a −10-volt source. The terminals 54 and 56 are also connected through diodes 60 and 61 to positive and negative reference voltage sources, such as + and −1 volt, respectively.

The input terminal 62 of the diode bridge may be directly connected to the flip-flop or may be connected through a level shifter such as zener diode 64 to the output terminal of a register stage. The cathode of the zener diode is connected through resistor 66 to a positive voltage source and its anode is connected through resistor 67 to a negative voltage source. In one particular embodiment, the register stages employed were integrated circuit flip-flops such as one-half of a Signetics Type 8828 dual flip-flop.

The output terminal 70 of the diode bridge is connected through capacitor 72 to ground. It is also connected to the summing "resistor" shown in FIG. 2 to comprise a network which includes the series resistor $R_S$ and the shunt resistor $R_B$.

In the operation of the circuit of FIG. 2, if the input digit $Y_n$ is positive when a clock pulse occurs, the output signal present at lead 74 either remains positive, if it was positive previously, or changes from ground level to a positive level. If the signal $Y_n$ is negative when the clock pulse occurs, the signal present at lead 74 remains at ground, if it was at ground previously, or goes to ground if it was positive previously. A voltage at ground level at lead 74 is translated by the zener diode 64 to a −2-volt level at input terminal 62 to the diode bridge. A positive voltage, which may be of the order of +5volts, present at lead 74 is translated to a +3-volt level at input terminal 62 of the diode bridge.

If terminal 62 switches from a negative value to a positive value, diodes 50 and 53 are cut off and diodes 52 and 51 conduct. Conducting diode 51 permits the positive 10 volt source to charge capacitor 72 through resistor 55. The result is a positive-going voltage ramp at output terminal 70.

If the voltage present at terminal 62 changes from a positive to a negative value, diodes 50 and 53 are rendered conductive and diodes 51 and 52 are cut off. Now the negative 10-volt source charges the capacitor 72 through resistor 57 and diode 53. The result is a negative-going voltage ramp across capacitor 72.

During the production of positive and negative going ramps, the +1-volt source prevents terminal 70 from going more positive than +1 volt and the −1 volt source prevents it from going more negative than −1 volt. The result is that the positive and negative voltage ramps are of constant amplitude and extend from, in this particular circuit, −1 volt to +1 volt and +1 volt to −1 volt respectively.

If the voltage present at input terminal 62 to the diode bridge remains constant from one clock pulse to the next, the voltage present at output terminal 70 also remains constant. In the case in which the input voltage at terminal 62 remains constant and positive, the output voltage at terminal 70 remains constant at +1 volt. In the case in which the input voltage at terminal 62 remains negative and constant at −2 volts, the output voltage at terminal 70 remains constant at −1 volt.

As already mentioned, the resistor network $R_S$, $R_B$ is different for each selector circuit of a group of such circuits. The chart below gives some typical values of the resistors for the Y-deflection waveform generator. The values of the resistors for the X-deflection waveform generator are, of course, identical.

| Weight | $R_S$ (Ohms ×$10^3$) | $R_B$ (Ohms ×$10^3$) |
| --- | --- | --- |
| $2^0=1$ | 320. | 5.08 |
| $2^1=2$ | 160. | 5.16 |
| $2^2=4$ | 80. | 5.34 |
| $2^3=8$ | 40. | 5.72 |
| $2^4=16$ | 20. | 6.66 |
| $2^5=32$ | 10. | 10.00 |
| $2^6=64$ | 5. | ∞($R_B$ Absent) |

Some other values of circuit parameters, given by way of example, are as follows:

Resistors 55 and 57 = 3.01 times $10^3$ ohms for the three least significant digits = 2.75 times $10^3$ ohms + 500 ohms potentiometer for the four most significant digits Capacitor 72 = 33 ×$10^3$ picofarads Summing Amplifiers = RCA Integrated Circuit Type CA 3029

In addition to the advantages already mentioned, the circuit of the present invention also has a number of other features. It is found, in practice, for example, that the ramps which are produced need not be linear to produce high quality characters, letters, symbols and the like. Exponential waveforms (such as RC network outputs) also yield precise, linear and accurate displays provided all selector ramps feature the same portion of the same RC exponential waveform. The circuit adjustments are found to be noncritical. The system is found to be relatively inexpensive. Most of the circuits may be integrated and many identical circuits are employed, thus further enhancing mass production economies. For example, the selectors are all identical; the summing amplifiers are identical; the registers may be identical.

The invention described above is illustrated by showing how a single character is generated. In practice, such a character may be relatively small, for example, a fourth of an inch by a fourth of an inch and may be positioned at a particular location on the screen by direct voltage levels applied to the X- and Y-deflection plates in conventional fashion.

While the present invention is described in terms of generating the strokes for a character, number, symbol or the like, it is to be understood that the invention is also suitable for use in graphics or vector generation, that is, the generation of patterns composed of isolated strokes of varying lengths and extending in different directions. The invention also may be used for the generation of waveforms for analog computer applications.

What is claimed is:

1. In combination: means for generating signals indicative of a multiple digit binary number whose value may change at successive intervals of time;
    means responsive to said signals for generating for each digit of said number a wave which is of a first constant level if the digit is equal to 0 and has not changed its value since the immediately preceding time interval, which is of a second constant level if the digit is equal to 1 and has not changed its value since the immediately preceding time interval, which is a linear transition from said first to said second level when the digit has changed its value in one sense since the immediately preceding time interval, and is a linear transition from said second to said first level when the digit has changed its value in the opposite sense since the immediately preceding time interval; and
    means for obtaining from said waves a sum wave comprising means for adding the waves representing the digits of the binary number with weight, in each case, proportional to the power of two represented by said digit.

2. In the combination as set forth in claim 1, said last-named means including a plurality of resistor means, each different one of said resistor means having a value such as to produce a current proportional to a different power of two in response to a voltage of given amplitude.

3. In the combination as set forth in claim 2, each said resistor means having substantially the same input impedance.

4. In the combination as set forth in claim 1, said means for generating for each digit a wave comprising: a plurality of substantially identical four terminal diode bridges, one pair of opposite terminals of each bridge being connected to terminals for positive and negative voltage sources, respectively, a third terminal of each bridge serving as an input terminal, and a separate charge storage means connected to the fourth terminal of each separate bridge.

5. In a stroke generator, in combination:
    means for generating a group greater than 2 of waves of the same duration and each wave having one of the following forms:
        a. first constant level;
        b. a second constant level;
        c. a wave which continuously increases from said first to said second level and
        d. a wave which continuously decreases from said second to said first level; and
    means for deriving from said group of waves a single sum wave comprising means for adding said waves with different weights.

6. In a stroke generator as set forth in claim 5, said means for adding comprising means for adding said waves, each wave with a weight proportional to a different power of two.

7. In a stroke generator, in combination:
    means for generating signals representing the digits of two binary numbers, each binary number capable of changing its value during successive equal time intervals, each binary number indicative of the end point of a stroke;
    means responsive to the signals representing the respective digits of each binary number for producing analog signals, one such signal per digit, each signal having an initial value which is its final value during the immediately preceding time interval, and having a final value equal to, or a given amount more than, or a given amount less than, said initial value depending upon whether the binary digit the analog signal represents has not changed its value, has changed from a first to a second value or has changed from its second to its first value, respectively, in each case relative to the value of the binary digit during the immediately preceding time interval;
    means for producing a first deflection waveform comprising means for adding the analog signals representing the first number with weights, proportional in each case, to the power of two represented by the corresponding digit; and
    means for producing a second deflection waveform comprising means for adding to the analog signals representing the second number with weights, proportional in each case, to the power of two represented by the corresponding digit.